March 6, 1962 C. W. HELM, JR., ET AL 3,024,322

SOUND TRANSLATING APPARATUS

Filed May 15, 1958

4 Sheets-Sheet 1

INVENTORS
CHARLES W. HELM JR.
& FRANK L. MOORE

BY Raymond W. Colton

ATTORNEY

March 6, 1962 C. W. HELM, JR., ET AL 3,024,322

SOUND TRANSLATING APPARATUS

Filed May 15, 1958 4 Sheets-Sheet 2

INVENTORS
CHARLES W. HELM JR.
& FRANK L. MOORE
BY Raymond W. Colton
ATTORNEY

INVENTORS
CHARLES W. HELM JR.
& FRANK L. MOORE
BY Raymond W. Colton
ATTORNEY

March 6, 1962 C. W. HELM, JR., ET AL 3,024,322

SOUND TRANSLATING APPARATUS

Filed May 15, 1958 4 Sheets-Sheet 4

INVENTORS

CHARLES W. HELM JR.
& FRANK L. MOORE

BY Raymond Wolton

ATTORNEY

United States Patent Office 3,024,322
Patented Mar. 6, 1962

3,024,322
SOUND TRANSLATING APPARATUS

Charles W. Helm, Jr., Rocky Hill, and Frank L. Moore, Newington, Conn., assignors to The Gray Manufacturing Company, a corporation of Connecticut Filed May 15, 1958, Ser. No. 735,469
20 Claims. (Cl. 179—100.4)

This invention relates to sound translating apparatus applicable to various types of record media and transducers, to be shown and described for purposes of illustration as applied to equipment of the type depicted in copending application Serial No. 722,406, filed March 19, 1958 and entitled "Sound Transducing Apparatus."

Among the important novel aspects of the present invention is the use of a keyboard to achieve the five basic functions of such equipment, namely, on-off, recording, play-back, start-stop, and quick review during dictation. Another important aspect contemplated by the present invention is the use of a playback or reproducing head whose stylus is retained out of contact with the recording medium during recording conditions, the stylus engaging the medium only during the listen and quick review conditions, thus greatly extending the stylus life. A very important characteristic of the invention contemplated herein is the use of a changeover switch capable of establishing recording conditions on the one hand and reproducing conditions on the other, which switch is normally biased towards its recording position which it assumes during recording and neutral conditions.

A lock-out mechanism is provided to prevent the simultaneous actuation of the talk and listen keys, which also functions to restore a neutral condition during each conversion from listen to talk or talk to listen conditions.

The reproducing head is urged to its retracted position relative to the record medium by means of a spring and in a preferred form of the invention, it is the same spring that biases the changeover switch towards its recording or talk position. When the force of the biasing spring has been overcome to shift the changeover switch to its listen position, the reproducing head is advanced towards the record medium by means of another spring in accordance with a preferred embodiment of the present invention.

Whereas the lockout mechanism performs a latching function in response to the depression of either the listen or talk key, its latching condition will not be disturbed during talk conditions by depression of the quick review key which must be maintained in its depressed condition so long as the quick review function is to be continued. The provision of a quick review control on a machine of the kind contemplated herein is believed to be novel as is its combination with the use of a reproducing head which is maintained in retracted position relative to the recording medium during the recording function. As a matter of fact, the present invention is believed to represent the first achievement of quick review mechanically as distinguished from electrically.

Another advantage of the apparatus contemplated herein is the use of opposed rollers for engaging opposite surfaces of the record medium, both rollers being positively driven to permit a substantial reduction of roller pressure with the result that deformation of the medium in the vicinity of the stylus will be reduced and starting and stopping will be rendered smoother and quieter and the reproduction qualities of the equipment will be vastly improved.

The sound translating apparatus contemplated by the present invention is eminently suited for remote control functions of the types previously proposed and employed in conjunction with equipment of this type.

It is among the objects of this invention to provide sound translating apparatus comprising a frame providing a record support, recording and reproducing heads carried by the frame independently movable towards and from a record on the support, amplifying means having input and output circuits for electrical interconnection with the heads, sound transducing means adapted for connection with the circuits, switching means having a recording position connecting the transducing means with the input circuit and the recording head with the output circuit, and a reproducing position connecting the reproducing means with the input circuit and the transducing means with the output circuit, biasing means urging the switching means to its recording position, and selecting means including a control element for shifting the switching means in opposition to the biasing means to its reproducing position. Supporting means for the reproducing head normally maintain it in retracted position relative to the record and force transmitting means actuated by the biasing means urges such supporting means and reproducing head towards such retracted position. A pair of opposed springs act on the supporting means and the selecting means includes a lever for overcoming the force of one of these springs. The selecting means includes a second control element for advancing the recording head towards the record. An interlock mechanism connected with the control elements prevents their simultaneous operation. A line switch for energizing the amplifier is carried by the frame and operatively connected to each of the control elements to establish a circuit upon operation of either of them. A record driving motor is carried by the frame and a line switch for energizing the motor is operatively connected to each of the control elements to establish a circuit upon operation of either of the control elements. A pair of friction rollers are carried by the frame for engagement with opposite surfaces of a record and a motor carried by the frame drives the rollers in opposite directions. The rollers are relatively movable towards and from the record and means connected to the control element imparts relative movement to the rollers. The selecting means includes a second control element for advancing the recording head towards the record and means connected to the second control element imparts relative movement to the rollers.

Actuation of one of the control elements in one direction simultaneously shifts the switching means and produces relative movement of the reproducing head towards the record. The frame carries record driving means having a supply circuit and actuation of the control element in the direction stated effects closure of the supply circuit. The frame carries a record driving roller movable towards and from the record and actuation of the control element in the specified direction advances the roller towards the record. This control element includes a key movably supported on the frame. The control element includes a pair of keys movably supported on the frame, one of them being independently operable, the other operating only in cooperation with the first.

The frame carries an electromagnet including an armature connected to one of the control elements for remote actuationt hereof. The frame provides a support for a record driving roller movable towards and from the record and an electromagnet carried by the frame includes an armature operatively associated with the support for remote actuation thereof. The selecting means includes linkages connected with the heads, each of the linkages including a spring. A counterbalanced lever pivoted in the frame supports the reproducing head.

A more complete understanding of the invention will follow a detailed description of the accompanying drawings wherein.

Figures 1, 6:
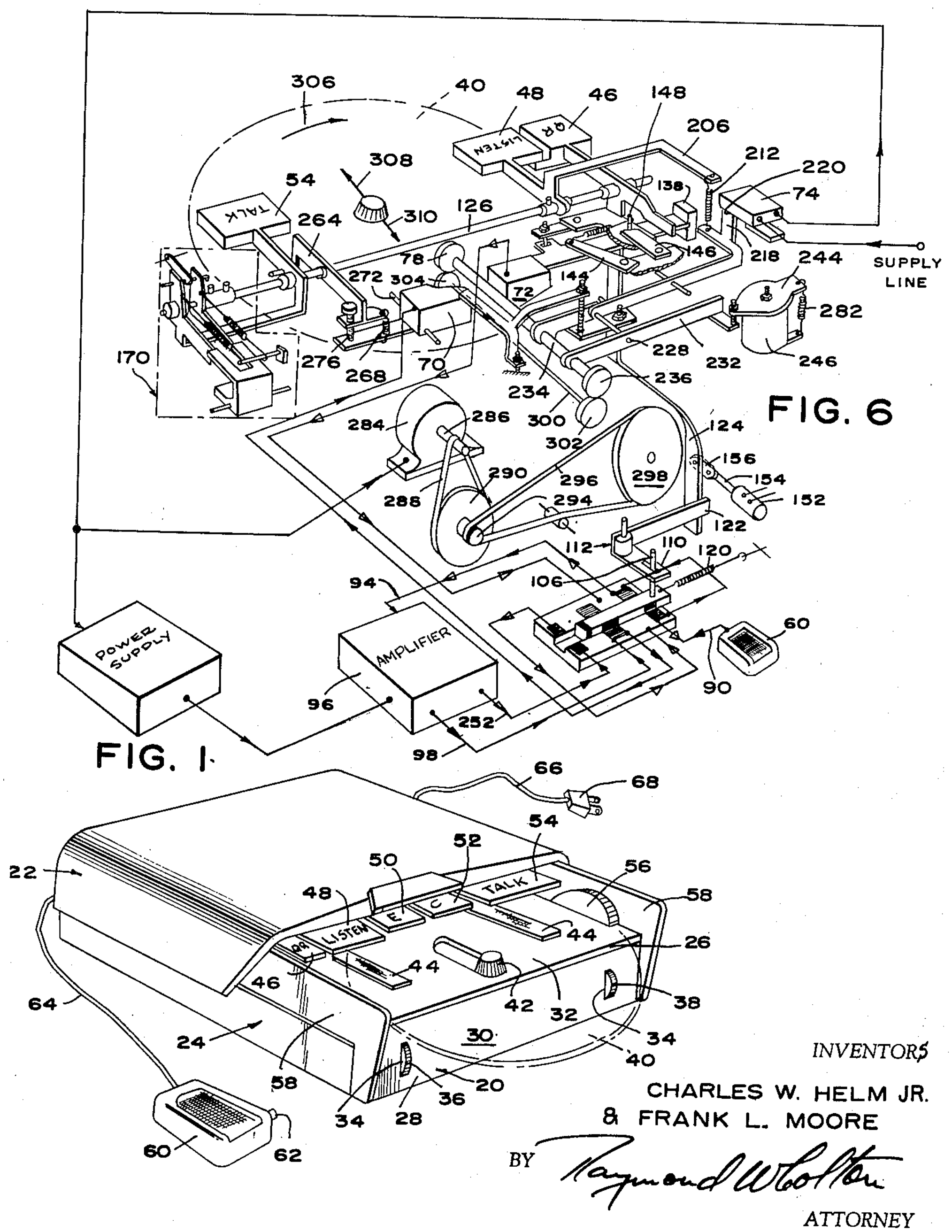
FIG. 1 is an isometric view depicting translating apparatus embodying the present invention.
FIG. 6 is a diagrammatic view depicting the equipment slightly differently to illustrate the positions assumed by the mechanical and electrical components under various conditions of operation.
Figure 2:
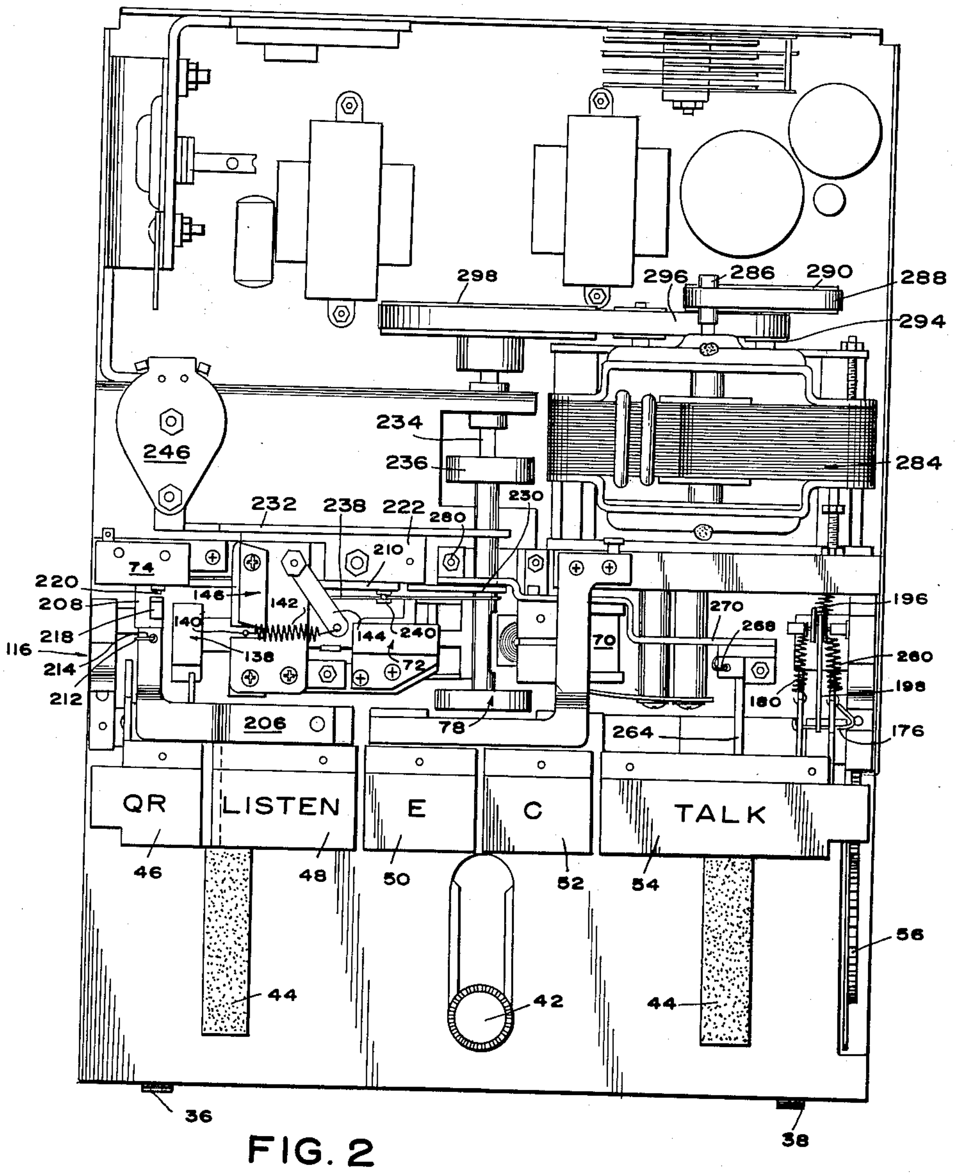
FIG. 2 is a top plan view of the apparatus with its covers removed.

The translating apparatus comprises a frame assembly 20, a top cover 22 and a bottom cover 24 depicted in their assembled relationship in FIG. 1. The frame assembly includes a top frame 26 and a bottom frame 28, the major portions of which are concealed by the covers. As clearly shown in FIG. 1 however, the front end wall 30 of the bottom frame is exposed as is the forward portion of the upper surface or deck 32 of the top frame member 26.

Towards the opposite ends of the front wall 30 of the bottom frame, slots 34 are provided through which thumb wheels 36 and 38 project for the selection of the proper gain adjustment for listening and dictation respectively. The exposed portion of the upper surface 32 of the top frame member 26 constitutes a deck for the record disc 40, depicted in broken lines, which is impaled on a fluted spindle 42 and which is supported above the deck by spaced plush or mohair strips 44. Selecting means, comprising operating levers for controlling the functions of the apparatus and for punching a suitable index element, are carried by the frame assembly, and proceeding from left to right as viewed in FIG. 1, there will be found a quick review key or lever 46, a listen key or lever 48, an end punch key or lever 50, a correction punch key or lever 52 and a talk key or lever 54. Also projecting through the upper wall or surface 32 of the top frame member is a thumb wheel 56 for adjusting the relative positions of the record and sound head or heads, not shown in FIG. 1. The bottom cover 24 provides relatively prominent side walls 58 adjacent the exposed portions of the frame assembly 20 which project upwardly and forwardly sufficiently to protect the exposed operating parts of the equipment including the various levers and wheels.

Transducing means in the form of a combined speaker and microphone 60 equipped with a start-stop switch operator 62 is connected to the apparatus electrically by means of a conductor cable 64. The apparatus is connected to a power source by means of a cable 66 terminating in a plug 68.

As depicted in FIGS. 1, 2, 3 and 6, the apparatus is in its neutral condition with the quick review key 46, the listen key 48 and the talk key 54 in their level positions. Under these conditions, the recording head 70 and the reproducing head 72 are retracted with respect to the record 40, the line switch 74 is open, the changeover switch 76 is in its recording or talk position and the record engaging pressure roller 78 is retracted relative to the record.

Figure 3:
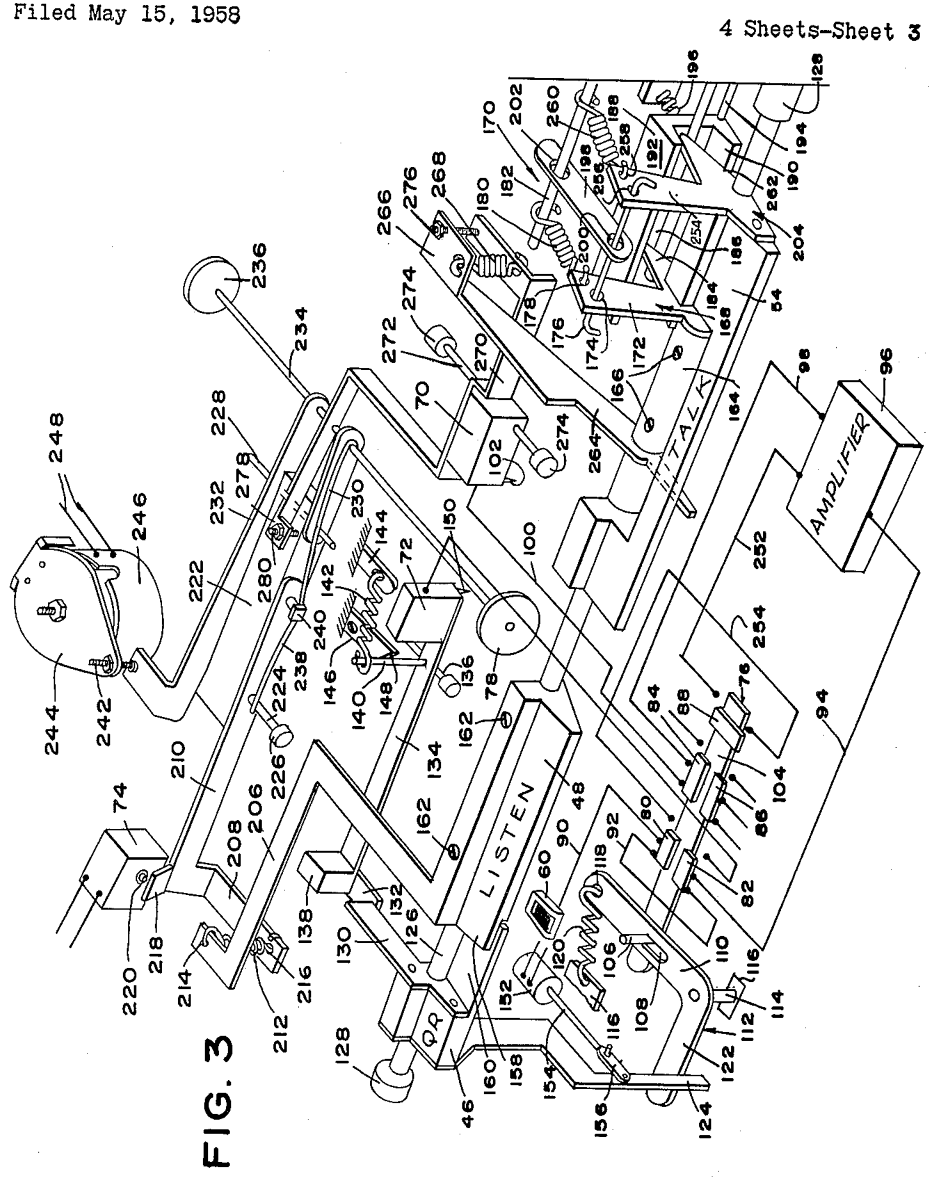
FIG. 3 is a diagrammatic representation of mechanical and electrical portions of the apparatus in their neutral positions.
Figure 4:
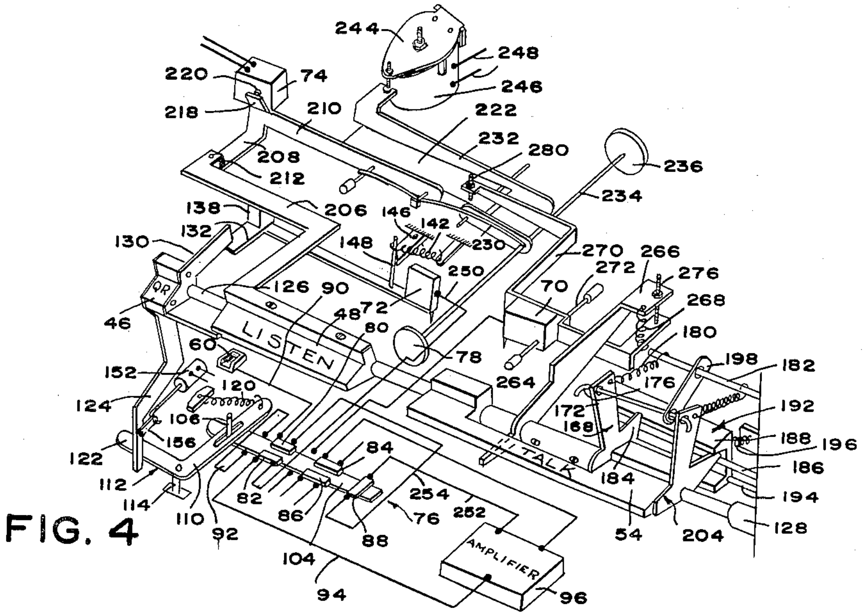
FIG. 4 is a view on a reduced scale like that of FIG. 3 depicting the listen positions assumed by the components.
Figure 5:
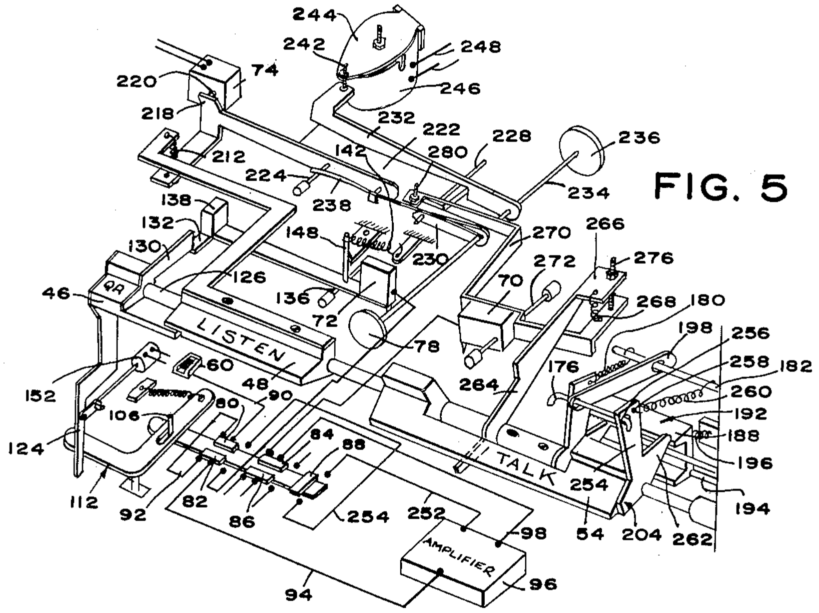
FIG. 5 is a view like that of FIG. 4 depicting the talk position of the equipment.

The changeover switch 76 is diagrammatically depicted in FIGS. 3, 4 and 5 as having contact blades 80, 82, 84, 86 and 88. This changeover switch establishes a talk condition when the control keys assume either their neutral positions or their talk positions. Accordingly, in the neutral condition depicted in FIG. 3, the changeover switch has established circuit conditions ready for recording. Thus, tracing a circuit from the transducer 60 serving as a microphone, a circuit is established through the lead 90 to the contact blade 80, lead 92, contact blade 82, input lead 94, amplifier 96, output lead 98, contact blade 84, recording head lead 100 and recording head 70 so that its stylus 102 will modulate the record when it is advanced to its recording position. The changeover switch 76 has been depicted as a two-position reciprocating switch whose movable plate 104 carries a pin 106 received in an elongated slot 108 formed in an arm 110 of a bell crank 112 mounted on a pivot 114 carried by the frame 116 of the apparatus. Towards the free end of the arm 110 it is provided with an opening 118 for the reception of one end of a spring 120 whose other end is received by an opening provided by an element secured to the frame 116. It is this spring 120 which biases the changeover switch towards its recording position by means of the pin 106 received in the slot 108 of the arm 110 of the bell crank. The other arm 122 of the bell crank is maintained in bearing engagement with a lever 124 secured to the quick review key 46 and pivoted therewith for free rotation about a control shaft 126 whose opposite ends are received in bearings 128 suitably supported by the frame. The bearing relationship between the arm 122 of the bell crank 112 and the lever 124 is also maintained under the influence of the biasing spring 120 interconnecting the other end of the bell crank with the frame. It will be clear that when the quick review key 46 is depressed, it will rotate about the control shaft 126 causing its lever 124 to impart a movement to the bell crank 112 in a clockwise direction as viewed in FIG. 3 to shift the changeover switch plate 104 to the right. Also secured to the quick review key 46 and rotatable therewith about the control shaft 126 is an arm 130 which bears upon a plate 132 carried by one end of a lever 134 supported on a pivot 136 carrying the reproducing head 72 at its opposite end. At the end of the lever 134 remote from the reproducing head, a counterbalance weight 138 is provided. The lever 134 is provided with a pin 140 disposed in line with the axis of its pivot 136, the upper end of the pin receiving one end of a spring 142 whose other end is received by an element 144 attached to the frame. Thus it will be apparent that the spring 142 will tend to rock the lever 134 in a clockwise direction about its pivot 136 as viewed in FIG. 3. An adjustable stop 146 is also carried by the frame so that its inclined end 148 can be imposed in the path of the pin 140 to limit the degree of movement of the lever 134 and thereby control the extent of advance of the reproducing head 72 and its stylus 150 with respect to the record. Thus, when the quick review key 46 is depressed it will actuate the changeover switch 76 so as to shift it from its record position to its reproduce position and as the arm 130 becomes sufficiently elevated so as to clear the plate 132, the lever 134 will move clockwise under the force of the spring 142 to advance the reproducing stylus 150 into proper engagement with the record.

The quick review function is also susceptible to remote control by means of an electromagnet 152 whose armature 154 is connected with the lever 124 by a link 156. Upon energization of the electromagnet 152 by means of a suitable remote switch, the same movements and results will occur as have been described with reference to depression of the quick review key 46.

It will be clear that as soon as the quick review key 46 has been released, the biasing spring 120 will move the bell crank 112 counterclockwise about its pivot 114 to restore the changeover switch 76 to its talk position and also to elevate the quick review key 46 to its inactive position causing the arm 130 to reengage the plate 132 and move the lever 134 counterclockwise about its pivot 136 against the force of the relatively weak spring 142, thus elevating the stylus 150 above the record. When the listen key 48 is depressed, it depresses the quick review key 46 as well by virtue of an overhanging portion 158 of the listen key bearing upon an extension 160 of the quick review key. Thus, when the listen key is depressed, all of the functions performed by depression of the quick review key will be accomplished together with additional functions. Assuming that the keys are in their neutral position as depicted in FIG. 3, when the listen key 48 is depressed, it will rock the control shaft 126 to which it is secured against rotation by means of screws 162 and thereby rotate a sleeve 164 which is also secured to the shaft by means of screws 166. Such a depressed condition of the listen key 48 has been depicted diagrammatically in FIG. 4. A listen latch member 168 secured to the sleeve 164 constitutes an element of the lockout mechanism 170. The latch member 168 is provided with an upwardly directed arm 172 containing an opening 174 loosely receiving a pin 176 and containing another opening 178 for the reception of one end of a spring 180 whose other end is connected to a rod 182 secured to the frame. The latch member is also provided with a rearwardly directed arm 184, which in the neutral position shown in FIG. 3 rests upon a stop rod 186 carried by the frame. This stop rod 186 lies between the upper flange 188 and lower flange 190 of a channel member 192 which is pivotally mounted relative to the frame on a pin 194 and biased forwardly with respect to the frame by means of a spring 196. Depression of the listen key 48 to rotate the shaft 126 will also rotate the sleeve 164 and the listen latch member secured thereto to elevate the rearwardly directed arm 184 to cause the channel member 192 to rotate about its pivot pin 194 against the force of the spring 196 until the rearwardly directed arm 184 assumes a position above the upper flange 188 whereupon the spring 196 will urge the channel member 192 forwardly so as to prevent return movement of the latch member under the force of its now extended spring 180. During the movement of the listen latch member from its neutral position to the listen position depicted in FIG. 4, a safety link 98 providing a forward opening 200 loosely receiving the pin 176 and a rearward opening 202 receiving the rod 182, is forced to move from its central position depicted in FIG. 3 to the position depicted in FIG. 4 where its forward end has shifted to the right. This shift is necessitated by the fact that in order to assume its latched condition, the listen latch member must move forwardly with respect to the rod 182, a distance which is greater than the effective length of the link 198. Since under these circumstances, the record latch member 204 has not moved, the link 198 can still bridge the distance between the right end of the pin 176 and the rod 182. An arm 206 secured to the listen key 48 is coupled to an arm 208 of a lever 210 through a helical spring 212 whose ends are received in openings 214 and 216 of the arms 206 and 208 respectively. An inclined cam 218 carried by the lever 210 cooperates with a follower 220 for actuation of the contacts of the line switch 74. In the lowered position of the cam 218, the follower will be extended to produce an open circuit at the switch. When the cam is elevated, the follower will be advanced to close the contacts of the line switch. The lever 210 is secured to a block 222 and with it pivotally mounted for movement about a shaft 224 carried by a bearing 226 suitably supported by the frame. Towards its right end as viewed in FIG. 3, the block 222 supports a pivot shaft 228 pivotally carrying an arm 230 disposed forwardly of the block 222 and an arm 232 disposed rearwardly of the block 222. The right ends of these arms carry a counter shaft 234 which rotatably supports the record engaging pressure roller 78 and its driving roller 236. The counter shaft 234 and its supporting arms 230 and 232 are biased in a clockwise direction by means of a wire spring 238 having one end bearing on the counter shaft, its other end bearing on the shaft 224 and an intermediate portion disposed below a stud 240 secured to the block 222. The left end of the arm 232 is engaged by the lower end of an adjustable screw 242 carried by an armature 244 of a start-stop solenoid 246 energized from a remote position through its leads 248. When the solenoid 246 is energized, its armature 244 will be moved downwardly as viewed in FIG. 3 to rotate the rearward arm 232 about its shaft 228 in a counterclockwise direction to elevate the shaft 234 against the force of the spring 238 and thereby disengage the record engaging pressure roller 70 from the record. Movement of the record engaging pressure roller 78 and its shaft 234 towards and from the record is also controlled by movement of the lever 210 under the control of the listen key. When the listen key is depressed, and the lever 210 rotated clockwise about its shaft 224, the roller shaft 234 is lowered somewhat so that operation of the start-stop solenoid will assure driving engagement with the record. Such driving engagement is thus dependent upon the position of the lever 210 and its block 222 and the condition of the solenoid 246.

Under these listen conditions as depicted in FIG. 4, the changeover switch 76 will provide a circuit from the reproducing head 72, lead 250, contact blade 82, lead 94 to the input of amplifier 96, lead 252, contact blade 88, lead 254, contact blade 80, and lead 90 to the transducer 60 now serving as a speaker.

Assuming that the apparatus is in its listen condition as depicited in FIG. 4 and it is desired to change over to the talk or recording condition, the talk key or lever 54 will be depressed for movement about the control shaft 126 on which it is freely mounted, carrying with it the talk or record latch member 204 having an upwardly directed arm 254 having a forward opening 256 for loosely receiving the pin 176 and a rear opening 258 for the reception of the forward end of the spring 260 whose rear end is fastened to the rod 182. The record latch member also has a rearwardly directed arm 262 having a rest position in engagement with the stop rod 186. The upper surface of the rearwardly directed arm 262 engages the undersurface of the upper flange 188 of the channel 192 upon depression of the talk key 54 to impart a rocking movement to the channel about its pivot pin 194 sufficient to release the rearwardly directed arm 184 of the listen latch member 168 permitting its spring 180 to restore it to its rest position as depicted in FIG. 3. Concurrent with the restoration of the listen latch member to its rest position or neutral position, the listen key 48 and quick review key 46 will return to their neutral positions and the components under the control of these keys will likewise return to their neutral positions. Further depression of the talk key 54 will cause the rearwardly directed arm 262 of the record latch member to ride above the upper flange 188 of the channel member 192 whereupon the spring 196 will rock the channel member forwardly to retain the record latch member in its active position. During this motion, the spring 260 will be extended and the safety link 198 will be shifted so that its forward end moves to the left, as depicted in FIG. 5. Accompanying this depression of the talk key 54, a recording head actuating lever 264 pivoted on the control shaft 126 will move counterclockwise as viewed in FIG. 3 so that its rearwardly disposed end 266 moves upwardly to extend a spring 268 by which it is coupled to a recording head supporting lever 270 pivotally supported on a shaft 272 mounted in suitable bearings 274 carried by the frame. An adjustable stop pin 276 carried by the rearward end 266 of the lever 264 determines the position of the lever 264 with respect to the lever 270 upon contraction of the spring 268. An extension of the lever 270 carries a plate 278 receiving an adjustable screw 280 for the imposition of activating forces to the block 222 and lever 210 for actuation of the line switch 74 and the record engaging pressure roller 78. When the talk key 54 is depressed, it bears upon the forward end of the recording head actuating lever 264 to rock it about the control shaft 126 and through the spring 268 imparts counterclockwise movement to the lever 270 about its shaft 272 causing the recording head 70 and its stylus 102 to advance towards the record, and through the extension of the lever 270 and its adjustable screw 280, the block 222 and lever 210 will be moved clockwise about their shaft 224 to depress the record engaging pressure roller 78 and its shaft 234 towards the record and elevating the cam 218 for closure of the line switch 74.

The relative positions of the various parts during talk or record conditions is depicted in FIG. 5 of the drawings. To restore the equipment to its neutral condition, it is merely necessary to partially depress the listen key 48 sufficiently to trip the record latching member 204 whereupon the parts will assume the positions depicted in FIG. 3.

As shown in FIG. 6, the armature of the start-stop solenoid is ordinarily maintained in its elevated position by means of a spring 282. Also schematically depicted in FIG. 6 is a driving motor 284 whose shaft 286 is coupled through a belt 288, pulley 290, pulley 294, belt 296 and pulley 298 to a shaft 300 carrying a drive roller 302 for driving the roller 236 and a record engaging drive roller 304 which forms a bight with the record engaging pressure roller 78 which is positively driven by its shaft 234 which also carries the roller 236. FIG. 6 also schematically depicts the circuit conditions for both the talk and listen functions. The solid arrows indicate the circuit conditions during the talk or record operation whereas the outlined arrows indicate the circuit conditions during the listen or reproduce operation.

The direction of rotation of the record 40 is depicted by the arrow 306 in FIG. 6 and the movement of the carriage supporting the record 40 is depicted by the arrows 308 and 310. Whereas the carriage movement may be achieved in various ways, it can be patterned after the disclosure of the patent to Moore and Roberts, 2,628,842, dated February 17, 1953. The record may be supported for cooperation with the recording and reproducing styli in a variety of ways including the use of a so-called compensator of the type disclosed in the Moore et al. Patent 2,740,633, dated April 3, 1956.

The line switch can be controlled in the manner already described or it can be controlled independently of the other functions or combined with any of them where desired for particular applications.

From the foregoing description it will be clear that under neutral conditions of the machine with all of the keys elevated, a record disc can be inserted or removed with great facility. Under these conditions, both heads are elevated, the power is disconnected from the motor and amplifier, the pressure roller is elevated and the changeover switch assumes its talk condition.

When the talk key is depressed, the listen key is locked out, the record stylus is advanced to engage the record, the circuit is closed to energize the motor and amplifier, the drive rollers are positioned for actuation by the start-stop solenoid, and the circuit conditions for record are effective.

Depression of the quick review key under these conditions advances the listen head towards the record and actuates the changeover switch to produce circuit conditions for listening.

With the talk conditions still in effect, depression of the listen key restores the talk key to neutral, elevates the talk head, advances the listen head, completes the line circuit to the motor and amplifier, actuates the changeover switch to establish listen conditions and positions the drive rollers for engagement upon actuation of the start-stop solenoid.

Where as only one specific form of the invention has been described with reference to the accompanling drawings, the illustration should not be restrictive beyond the scope of the appended claims.

We claim:

1. Sound translating apparatus comprising a frame, a record support rotatably carried by said frame, recording and reproducing heads movably carried with respect to said record support by said frame, means individually supporting said heads for movement towards and from a record on said support, amplifying means having input and output circuits for electrical interconnection with said heads, sound transducing means adapted for connection with said circuits, switching means having a recording position connecting said transducing means with said input circuit and said recording head with said output circuit, and a reproducing position connecting said reproducing head with said input circuit and said transducing means with said output circuit, biasing means urging said switching means to its recording positon, and selecting means providing a connection with said reproducing head to shift it towards said record support and including a control element for shifting said switching means in opposition to said biasing means to its reproducing position.

2. Sound translating apparatus as set forth in claim 1 including means associated with said supporting means for said reproducing head normally to maintain said head in retracted position relative to said record.

3. Sound translating apparatus as set forth in claim 2 including force transmitting means actuated by said biasing means for urging said supporting means and reproducing head towards said retracted position.

4. Sound translating apparatus as set forth in claim 2 including a pair of opposed springs acting on said supporting means and wherein said selecting means includes a lever for overcoming the force of one of said springs.

5. Sound translating apparatus as set forth in claim 1 wherein said selecting means includes a second control element for advancing said recording head towards said record.

6. Sound translating apparatus as set forth in claim 5 including an interlock mechanism connected with said control elements preventing their simultaneous operation.

7. Sound translating apparatus as set forth in claim 5 including a line switch for energizing said amplifier carried by said frame and operatively connected to each of said control elements to establish a circuit upon operation of either of said control elements.

8. Sound translating apparatus as set forth in claim 5 including a record driving motor carried by said frame and a line switch for energizing said motor operatively connected to each of said control elements to establish a circuit upon operation of either of said control elements.

9. Sound translating apparatus as set forth in claim 1 including a pair of friction rollers carried by said frame for engagement with opposite surfaces of a record, and a motor carried by said frame for driving said rollers in opposite directions.

10. Sound translating apparatus as set forth in claim 9 wherein said rollers are relatively movable towards and from said record, and including means connected to said control element to impart relative movement to said rollers.

11. Sound translating apparatus as set forth in claim 9 wherein said rollers are relatively movable towards and from said record, said selecting means includes a second control element for advancing said recording head towards said record, and including means connected to said second control element to impart relative movement to said rollers.

12. Sound translating apparatus as set forth in claim 1 wherein actuation of said control element in one direction simultaneously shifts said switching means and produces relative movement of said reproducing head towards said record.

13. Sound translating apparatus as set forth in claim 12 wherein said frame carries record driving means having a supply circuit, and actuation of said control element in said direction effects closure of said supply circuit.

14. Sound translating apparatus as set forth in claim 12 wherein said frame carries a record driving roller movable towards and from said record, and actuation of said control element in said direction advances said roller towards said record.

15. Sound translating apparatus as set forth in claim 1 wherein said control element includes a key movably supported on said frame.

16. Sound translating apparatus as set forth in claim 15 wherein said control element includes a pair of keys movably supported on said frame, one of said keys being independently operable, the other of said keys operating only in cooperation with the first.

17. Sound translating apparatus as set forth in claim 1 wherein said frame carries an electromagnet including an armature connected to said control element for remote actuation thereof.

18. Sound translating apparatus as set forth in claim 1 wherein said frame provides a support for a record driving roller movable towards and from said record, and an electromagnet carried by said frame includes an armature operatively associated with said support for remote actuation thereof.

19. Sound translating apparatus as set forth in claim 1 wherein said selecting means includes linkages connected with said heads, each of said linkages including a spring.

20. Sound translating apparatus as set forth in claim 1 including a counterbalanced lever pivoted in said frame supporting said reproducing head.

References Cited in the file of this patent

UNITED STATES PATENTS 2,613,939 Moore ---------------- Oct. 14, 1952
2,952,747 Balmer et al. ---------- Sept. 13, 1960